H. E. HAWK.
DELINTING APPARATUS.
APPLICATION FILED MAY 3, 1909.
1,041,468.
Patented Oct. 15, 1912.
3 SHEETS—SHEET 3.
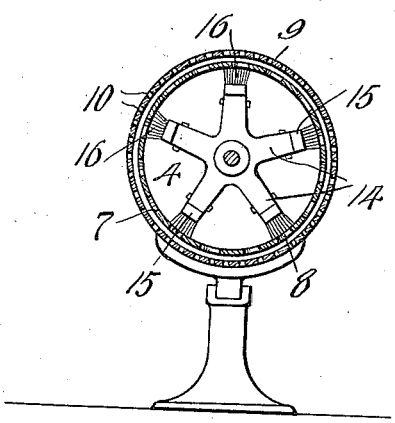
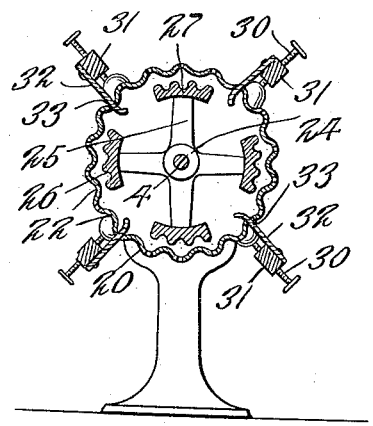
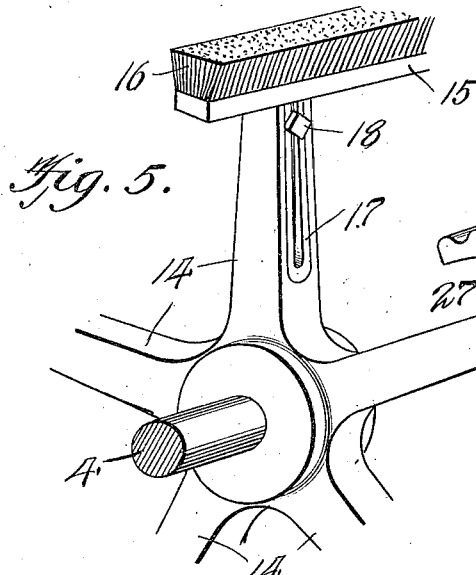
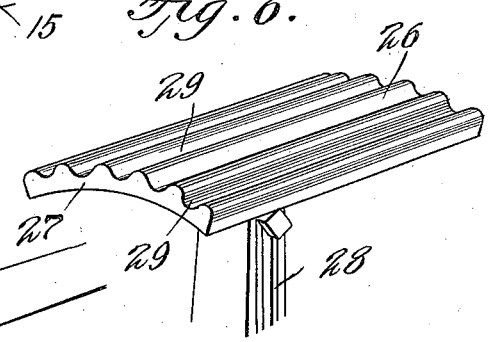
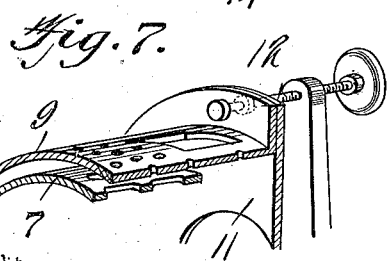
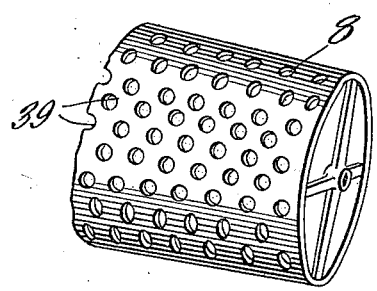
Witnesses
Frank B. Hoffman.
D. W. Gould.
Inventor
Hale E. Hawk
By Victor J. Evans
Attorney

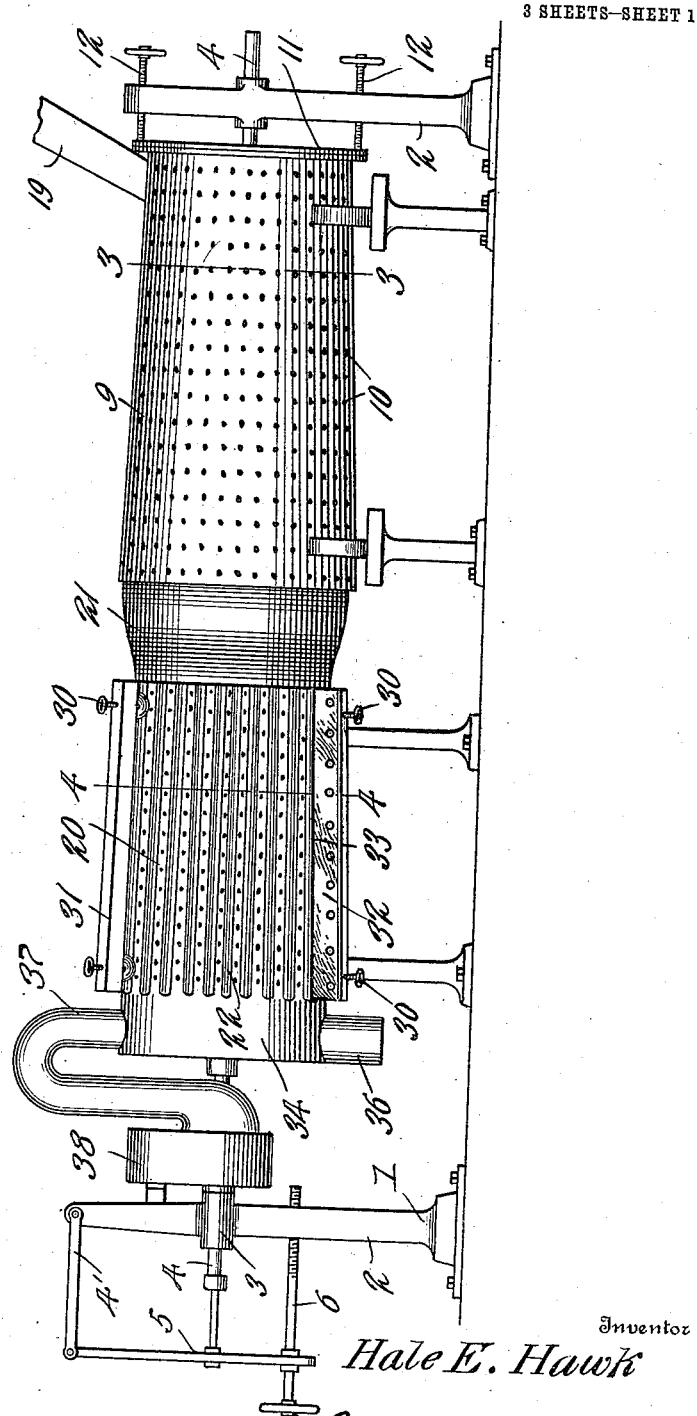

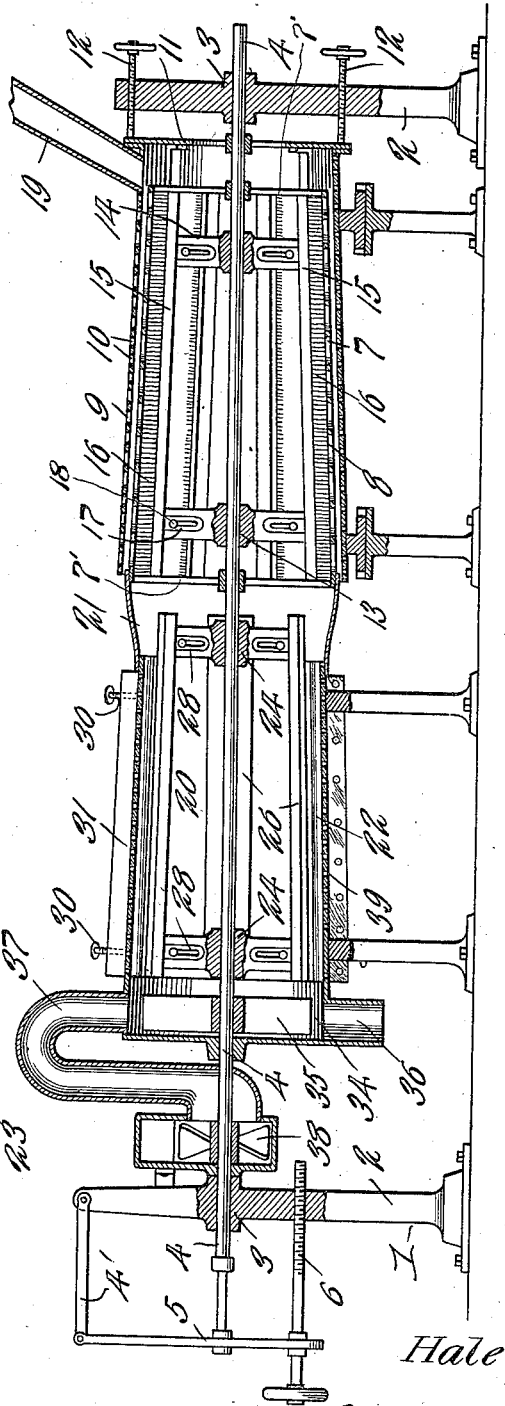

UNITED STATES PATENT OFFICE.

HALE E. HAWK, OF GREENVILLE, MISSISSIPPI.

DELINTING APPARATUS.

1,041,468.  Specification of Letters Patent.  Patented Oct. 15, 1912.

Application filed May 3, 1909. Serial No. 493,758.

*To all whom it may concern:*

Be it known that I, HALE E. HAWK, a citizen of the United States, residing at Greenville, in the county of Washington and State of Mississippi, have invented new and useful Improvements in Delinting Apparatus, of which the following is a specification.

The invention relates to an improvement in delinting apparatus, being more particularly directed to a machine in which cotton seed are treated in such manner as to thoroughly separate the lint from the seed, polish the seed and clean the lint from dirt and other refuse.

The main object of the invention is the provision of a delinting apparatus in which the seed in their original condition are subjected to a brushing operation to effectually remove the lint, the construction providing for the travel of the seed lengthwise of the machine and automatically and periodically interrupting such travel and holding the seed in comparatively fixed position to insure a more effective brushing action.

A further object of the invention is the provision of means whereby the various parts of the brushing section of the apparatus may be manually adjusted to accommodate and provide for the effective handling of seed of different sizes and to take up the wear of the brushes incident to use.

A further object of the invention is the provision of a cleaning and polishing section to which the seed are automatically delivered from the brushing section, in which cleaning section the seed are cleaned and polished and the lint mass mechanically separated from the seed mass and discharged at separated points.

The invention will be described in the following specification, reference being had particularly to the accompanying drawings, in which:—

Figure 1 is a view in elevation of the complete apparatus. Fig. 2 is a longitudinal central section of the same. Fig. 3 is a section on line 3—3 of Fig. 1. Fig. 4 is a section on line 4—4 of Fig. 1. Fig. 5 is a perspective detail illustrating the connection of the brushes to the main shaft. Fig. 6 is a perspective detail of one of the beaters. Fig. 7 is a perspective detail, showing the connection of the casing of the brushing section to the frame. Fig. 8 is a broken perspective, showing a modified form of the retarding casing. Fig. 9 is a perspective detail, showing a modified casing to be used in place of both casings of the brushing section.

Referring particularly to the accompanying drawings, wherein is shown the preferred detailed structure of the improved delinting apparatus, 1 represents a frame for supporting the various parts of the structure, such frame comprising any and all parts necessary for a proper support. The frame essentially includes end uprights or standards 2, having bearings 3 wherein a main operating shaft 4 is mounted. The shaft is so mounted in its bearings as to permit a longitudinal as well as a revoluble movement, and to provide for the mechanical control of the longitudinal movement I secure to one of the uprights a laterally projected arm 4', to the free end of which is pivotally connected an adjusting lever 5, centrally connected with the main shaft, the lower end of the lever being appropriately mounted upon a manually operable screw rod 6 having threaded engagement with the upright. Through manipulation of the screw rod the main shaft may be adjusted longitudinally in its bearings, and thereby provide for the adjustment of certain parts of the apparatus which are carried by said shaft, as will presently appear.

Mounted on the shaft 4 adjacent to that upright 2 opposing the upright on which the shaft adjusting mechanism is mounted is a casing 7 of conical shape in longitudinal section, the smaller end of the casing being disposed next the upright and spaced therefrom. This casing may be supported on the shaft by means of spiders 7' in which the shaft may freely rotate, and means to be hereinafter described are provided to hold the casing securely against rotation. The casing 7, which will be hereinafter referred to as the retarding casing, in its preferred construction is formed with a series of openings 8 of elongated form, with their major axes arranged longitudinally of the casing. Surrounding the retarding casing is what is termed a holding casing 9, formed throughout its surface with a series of perforations 10 of such size as to prevent the passage therethrough of the seed, being preferably comparatively minute. The holding casing corresponds in shape to the retarding casing but is of a diameter exceeding that of the latter so that when the casings are arranged in concentric relation the holding casing is spaced from the retarding casing. The holding casing at its smaller end carries a frame or head 11, which is in turn swiveled on or connected with screw rods 12 which, as will be best seen in Fig. 7, are threaded through the upright 2 and provided beyond the same with hand wheels or other operating means. By turning the screw rods the holding casing may be adjusted longitudinally of the retarding casing thereby increasing or decreasing the distance between the opposed faces of said casings in accordance with the size of the seed being treated at the particular time.

Secured upon the main shaft 4 at points adjacent the respective ends of the retarding casing are collars 13, from which radiate a series of arms 14. To the longitudinally alined arms of the respective collars are secured brush elements including longitudinally disposed bars 15 carrying brushes 16 throughout the length and breadth of their outer edges and having arms 17 projecting from their inner edges to coöperate with the arms 14 of the collars. The arms 14 and 16 are connected in any appropriate manner, preferably through the medium of bolts 18, one of the arms being formed with a slot to permit the passage of the securing means whereby any particular brushing element may be adjusted toward and from the main shaft as may be desired to secure a proper brushing contact with the inner surface of the retarding casing.

The series of brushes, of which there may be any number desired, the retarding casing, and the holding casing constitute the brushing casing of the apparatus designed to initially treat the seed, and for the convenient entrance of the seed thereto I provide a chute 19 opening through the respective cylinders at their smaller or entrance ends, the seed in bulk being delivered to the chute in any desired manner.

Secured in longitudinal alinement with the brushing section is a cleaning casing 20, of conical shape in longitudinal section and having its small end disposed adjacent the larger end of the retarding casing, the retarding and cleaning casings being connected for the delivery of the seed from the latter to the former through the medium of a connecting shell 21 of circular form and appropriately secured at its ends to the respective casings. It will be understood that the cleaning casing 20 is firmly secured and supported, and it will thus be seen that the connecting shell 21 which connects the retarding casing with said cleaning casing serves to hold the retarding casing securely against rotation. The cleaning casing is formed with a series of longitudinally disposed recesses 22, preferably provided by corrugating the material of the casing as shown. The bottom of the corrugations, or more exactly the ridges formed in the outer surface of the casing by such corrugations are formed with a series of minute perforations 23, so that on the inner surface the cleaning casing presents a series of alternate longitudinally extending depressions and ribs, the bottoms of the depressions being formed with a series of alined perforations. The cleaning casing surrounds the main shaft, being supported in any appropriate manner, and on said shaft within the casing are mounted collars 24 to the arms 25 of which are secured beater elements 26 including arcuate shaped plates 27 having depending arms 28 designed to be adjustably connected to the arms 25 of the collars in any preferred manner, preferably as described in connection with the brushing elements. The plates 27 are of a length approximately corresponding to that of the cleaning casing, but the collars 24 are so mounted on the main shaft that the ends of the beaters next the retarding casing extend beyond the end of the cleaning casing proper so that the material delivered from the retarding casing is first directed onto the outer surface of the beater plates. The outer surface of said plates, or that surface next the inner surface of the casing is formed with a series of longitudinally extending channels 29 corresponding to the channels in the casing proper. At appropriate points the outer surface of the cleaning casing is provided with screw rods 30 so mounted on the casing as to prevent independent movement of said rods other than a revoluble movement. The rods are arranged in pairs longitudinally of the casing and each pair has threaded engagement with a bar 31 extending throughout the length of the casing and carrying on one face a cleaning element 32 designed to extend through a slot 33 formed in the casing. This element, which is preferably a strip of canvas or similar fabric is designed to exert a rubbing or polishing action on the seed, and its operative end may be adjusted to a required position within the casing by manipulation of the screw rods 30 in an obvious manner. The larger end of the cleaning casing communicates with a receiving casing 34, which casing as shown is preferably an integral continuation of the casing proper, though it is to be understood that it is entirely free of perforations or convolutions. Mounted upon the main shaft within the receiving casing 34 are one or more fan blades 35, designed to create a lateral current of air therein, and in alinement with the blade and opening through the lower portion of the casing is a seed delivery chute 36. Opening through the upper portion of the receiving casing diametrically opposed to the seed delivery chute is a lint conveyer 37, which is in communication with a suction fan 38 and also with a receiving receptacle (not shown).

With the parts constructed and arranged as described the operation of the improved apparatus is as follows: The seed with the mass of lint adhering thereto are delivered through the chute 19 into the retarding casing. The seed are immediately taken up by the brush members and by the force of the latter in the rotation of the main shaft are thrown against the retarding casing 7. The seed are by means of the brushes forced into the perforations 8 of the retarding casing, which perforations are of sufficient size to permit the seed to come through until they engage the inner surface of the holding casing. The seed thus held throughout the surface of the retarding casing is subjected to the full action of the brushes so that the lint is loosened from the seed on the side next the brush. As the lint is being pulled from the seed it will, as developed in practice, pull off on one side of the seed more than on the other thereby causing the brush to force the seed from the particular opening 8 and roll it onward to the next perforation, thus presenting a fresh surface to the action of the brush. By the motion of the brush and the centrifugal force developed thereby the seed are rolled longitudinally of the retarding casing from one opening to the next until the lint has been effectively separated from the seed proper. The mass of lint and seed are then delivered to the cleaning casing, taken up by the beaters and thrown against the corrugations in the casing. As the beaters revolve the seed are subjected to the action of the polishing members 33 and at the same time moved lengthwise the cleaning casing until all of the lint and dirt is effectively separated from the seed and the latter cleaned and polished. During the action of the brush in the brushing section of the apparatus the lint separated from the seed is more or less loosened or combed and the air currents created by the rotation of the brush are forced through the same thereby forcing a large proportion of the dirt and refuse carried in the lint through the perforations in the holding casing. This cleaning of the lint is further carried on in an identical way in the cleaning casing 20 until when reaching the casing the lint is practically free from dirt and the seeds are effectively cleaned of lint and polished. The lint is by the suction of the fan 38 drawn through the outlet 37, while the polished seed are delivered through the feed delivery chute 36.

In Fig. 8 I have shown a modified form of retarding casing in which the openings 39 are circular in form and of a size to permit a partial passage of the seed therethrough, the operation being identical with that described in connection with the preferred form. In Fig. 9 I have shown a corrugated casing having a series of perforations and contemplate the use if desired of such casing in place of both the retarding and holding casings 7 and 9 of the brushing section.

The construction described provides a simple apparatus which is admirably adapted for delinting cotton seed and polishing the seed while at the same time cleaning the lint of dirt and refuse. With the seed thus treated the value of the product for the usual purposes to which it is put is materially increased, as in the manufacture of cotton seed oil any appreciable amount of lint remaining with the seed and reaching the cookers is apt to become charred, thereby discoloring the oil besides adding an objectionable flavor. Furthermore, the value of the seed cake is increased as deleterious matter is practically eliminated therefrom in the manufacture of such cake from the seed as treated in the present apparatus.

It will, of course, be understood that the brushes and beaters may be manually adjusted by means of their connections with the collars, and may be further adjusted to take up wear by the longitudinal adjustment of the main shaft, as previously described. Furthermore, the space between the holding and retarding casings may be adjusted in accordance with the character of the seed being handled through the medium of the adjusting rods 12.

While I have described and shown the preferred embodiment of details of the apparatus, it is to be understood that I do not limit myself thereto but consider as within the spirit of my invention all such changes and modifications as may fall within the scope of the appended claims.

Having thus described the invention what is claimed as new, is:—

1. A delinting apparatus including a retarding casing formed with perforations to temporarily receive the seed during their passage longitudinally through the casing and momentarily hold said seed fixed with relation to the casing, a holding casing encircling the retarding casing to limit the movement of seed through the perforations in the retarding casing, and a seed treating member within the retarding casing.

2. A delinting apparatus including a retarding casing formed with perforations to temporarily receive the seed during their passage longitudinally of the casing and momentarily hold said feed fixed with relation to the casing, a holding casing encircling the retarding casing to limit the movement of the seed through the perforations in the retarding casing, means for adjusting one of the casings with relation to the other casing, and a seed treating member operating within the retarding casing.

3. A delinting apparatus including a retarding casing formed with perforations to temporarily receive the seed during their passage longitudinally of the casing and momentarily hold said seed fixed with relation to the casing, a holding casing encircling the retarding casing to limit the movement of the seed through the perforations in the retarding casing, means for adjusting the casings to vary the space between them, and a seed treating member operating within the retarding casing.

4. A delinting apparatus including a retarding casing of conical form formed with perforations to temporarily receive the seed during their passage longitudinally of the casing and momentarily hold said seed fixed with relation to the casing, a holding casing of corresponding conical shape encircling the retarding casing to limit the movement of the seed through the perforations in the retarding casing, means for effecting longitudinal adjustment of one of said conical casings with reference to the other conical casing to vary the distance between their opposed faces, and a seed treating member operating within the retarding casing.

5. A delinting apparatus including a retarding casing formed with seed receiving perforations, a holding casing encircling the retarding casing and serving to limit the movement of the seed through the perforations in the latter, and a brush rotatably operated within and in contact with the inner surface of the retarding casing.

6. A delinting apparatus including a retarding casing of conical shape formed with a series of openings to receive the seed, means independent of the retarding casing for limiting the movement of the seed through said openings, and a brush mounted for movement within the cylinder and adapted to contact with the inner surface thereof.

7. A delinting apparatus including a retarding casing of conical shape formed with a series of openings to receive the seed, means independent of the retarding casing for limiting the movement of the seed through said openings, a brush mounted for movement within the casing and adapted to contact with the inner surface thereof, and means for adjusting the brush longitudinally of the casing.

8. A delinting apparatus including a framework, a shaft mounted for rotation in the framework, means for adjusting the shaft longitudinally of the framework, a brushing section encircling one end of the shaft, said section including a conical retarding casing formed with seed receiving perforations, a conical holding casing encircling the retarding casing, a brush carried on the shaft, a cleaning section encircling the shaft in alinement with the brushing section, said cleaning section including a casing having open communication with the retarding casing, and beaters carried on the shaft.

In testimony whereof I affix my signature in presence of two witnesses.

HALE E. HAWK.

Witnesses:
J. W. JOYNER,
B. P. SHELBY.

---

Copies of this patent may be obtained for five cents each, by addressing the "Commissioner of Patents, Washington, D. C."